United States Patent [19]

Yamashita et al.

[11] 4,420,468

[45] Dec. 13, 1983

[54] METHOD OF TREATING CONVERTED POTASSIUM SULFATE FOR REDUCING A SMALL AMOUNT OF CHLORINE CONTAINED THEREIN

[75] Inventors: Yoshisato Yamashita; Masanobu Inoue, both of Minamatashi; Kohichi Fukatsu, Yachiyoshi, all of Japan

[73] Assignee: Chisso Corporation, Osaka, Japan

[21] Appl. No.: 344,011

[22] Filed: Jan. 29, 1982

[30] Foreign Application Priority Data

Jun. 15, 1981 [JP] Japan .................................. 56-92015

[51] Int. Cl.$^3$ ......................... C01B 7/01; C01D 15/06
[52] U.S. Cl. ..................................... 423/482; 423/552; 71/63
[58] Field of Search ..................... 423/552, 482; 71/61, 71/63

[56] References Cited

U.S. PATENT DOCUMENTS

| 1,389,861 | 9/1921 | Comment | 423/552 |
| 3,006,726 | 10/1961 | Simon | 423/552 |

FOREIGN PATENT DOCUMENTS

| 32-2666 | 5/1957 | Japan | 423/552 |
| 2856 | of 1902 | United Kingdom | 423/482 |
| 2053881 | 2/1981 | United Kingdom | 423/552 |

*Primary Examiner*—Gary P. Straub
*Attorney, Agent, or Firm*—Thomas E. Beall, Jr.

[57] ABSTRACT

A small amount of chlorine contained in the converted potassium sulfate obtained by dry-mixing and heating potassium chloride with sulfuric acid or potassium hydrogensulfate can greatly be reduced by totally pulverizing the potassium sulfate to 60 mesh pass, and then calcining at 300° to 500° C. for 5 minutes to one hour. The chlorine content is further reduced by adding a small amount of water or dilute sulfuric acid prior to calcination.

15 Claims, No Drawings

METHOD OF TREATING CONVERTED POTASSIUM SULFATE FOR REDUCING A SMALL AMOUNT OF CHLORINE CONTAINED THEREIN

BACKGROUND OF THE INVENTION

(1) Field of the Invention

This invention relates to a method of removing a small amount of chlorine contained in converted potassium sulfate. More particularly, this invention relates to a method of removing a small amount of chlorine contained in converted potassium sulfate in which method portions, having such particle sizes as to remain on a screen of 60 mesh, of converted potassium sulfate obtained by a dry process are pulverized and calcined.

(2) Description of the Prior Art

Converted potassium sulfate produced by a dry process is theoretically obtained by mixing and heating 2 moles of potassium chloride with one mole of sulfuric acid as a whole to form 2 moles of hydrogen chloride as a by-product as shown in the following equations (1) and (2):

$$KCl + H_2SO_4 \rightarrow KHSO_4 + HCl \quad (1)$$

$$KCl + KHSO_4 \rightarrow K_2SO_4 + HCl \quad (2)$$

Potassium hydrogensulfate melts above 200° C. and free sulfuric acid is also liquid. Therefore, the presence thereof in a large amount is liable to cause the reaction mixture to stick to an inner wall of a converter or to a stirrer in a reactor or a converter, resulting in making it difficult to attain an effective stirring and consequently a satisfactory reaction rate. In order to overcome the above difficulty, Japanese Patent Laid-open No. 17921/1981 (hereinafter referred to as a prior art method) discloses such a method to solve the problem of sticking as above (A) that more than an equivalent amount, that is, 2.0 to 2.2 moles of potassium chloride to one mole of sulfuric acid, is used, and (B) that the reaction in the first stage as shown in the equation (1) is carried out below 100° C. and subsequently in the reaction of the second stage shown in the equation (2), potassium chloride and potassium hydrogensulfate are mixed for heating in the presence of potassium sulfate as the final product as well as in the presence of a minimum amount of unreacted sulfuric acid.

According to the prior art method, however, potassium sulfate as the product often contains residual chlorine (contained in the form of KCl) in an amount of from about 2.0 to about 4.5% by weight, because more than an equivalent amount to sulfuric acid (or potassium hydrogensulfate) of potassium chloride is used. Therefore, converted potassium sulfate made by the prior art method as above could not be used as potassic fertilizer for tobacco, where the chlorine content therein is required to be below 2% by weight, particularly below 1% by weight. Consequently, the present inventors repeated the reaction of the second state shown by the equation (2) in the prior art method (A) by adding for mixing concentrated sulfuric acid in such an amount that the combined amount thereof with the residual free sulfuric acid is equivalent to the amount of the residual chlorine in the converted potassium sulfate obtained by the prior art method as above, or (B) by adding for mixing concentrated sulfuric acid in such an amount as to be two fold the amount added in (A) as above. The results show that it is difficult to make a residual chlorine content in the retreated potassium sulfate less than 2.0% by weight in the former case (A) as above, and that free sulfuric acid is contained in the retreated product in a considerable amount of from 3 to 4% by weight, though the residual chlorine content can be reduced to 1.0% by weight or so in the latter case (B) as shown in Table 1.

TABLE 1

Results of conversion reaction by addition of concentrated sulfuric acid:

| Reference Examples and Raw Material | Component (content) | Sample No. I | II | III |
|---|---|---|---|---|
| Raw Material | Free sulfuric acid (%) | 2.5 | 3.0 | 2.8 |
| | Residual chlorine content (%) | 3.5 | 4.0 | 3.8 |
| (A) | Amount of concentrated sulfuric acid added (%) | 2.33 | 2.53 | 2.44 |
| | Residual chlorine content after reaction (%) | 2.0 | 2.5 | 2.2 |
| (B) | Amount of concentrated sulfuric acid added (%) | 4.66 | 5.06 | 4.88 |
| | Residual chlorine content after reaction (%) | 0.9 | 1.1 | 1.0 |
| | Residual sulfuric acid content after reaction (%) | 3.55 | 4.03 | 3.80 |

The reasons why the residual chlorine content after reaction in Reference Example (A) is not reduced as expected are considered due to (a) the fact that less content of residual or added sulfuric acid compared with that of the product as potassium sulfate makes difficult satisfactorily uniform mixing thereof with the product, and (b) the fact that a chemical structure in the form of pyrosulfuric acid of the residual free sulfuric acid makes impossible to react readily with potassium chloride containing therein chemically the residual chlorine.

In the case of Reference Example (B), the residual chlorine content is satisfactorily reduced, but a high content of free sulfuric acid prior to the retreatment as above requires additional steps for removal or neutralization thereof to be inefficient and uneconomical.

On the other hand, in place of the prior art method mentioned above, the use of sulfuric acid in an excess thereof, that is, in an amount of more than one mole to 2 moles of potassium chloride increases the content of unreacted sulfuric acid in the reaction shown by the equation (2) as above, and consequently increases sticking of the reaction mixture to the inner walls of the reactor as well as agglomeration of the reaction mixture with the result that the content of the unreacted potassium chloride is not reduced contrary to expectations.

In any case, an industrially efficient production of converted potassium sulfate by dry process, which contains the residual chlorine in an amount less than 2.0% by weight, preferably less than 1.0% by weight, has been found difficult without allowing the free sulfuric acid to be contained in a considerable amount of from 3 to 5% by weight, for example.

The present inventors made intensive studies to solve the technical problems as above and accomplished this invention by finding (a) that the residual chlorine content represented by % by weight (hereinafter % all means % by weight) in the potassium sulfate obtained from the converter for the second stage of the prior art method greatly differs according to particle size such as lump or granule of larger particle size or powder, (b)

that the portion thereof in the form of lump or granule of larger particle sizes presents in an amount of from 20 to 25%, (c) that the portion in (b) is readily pulverizable to a certain powder, (d) that the portion thus pulverized may either be calcined at 300° to 500° C. for a short period of time to readily reduce the residual chlorine content to less than 3.5%, or may be mixed with a small amount of water or dilute sulfuric acid prior to calcination as above to readily reduce the residual chlorine content to less than 2.5%, and (e) that the portion in the form of powder of potassium sulfate product in (a) as above has such a residual chlorine content less than 1.0% and a very low content of free sulfuric acid as to be obtained as a converted potassium sulfate product of low chlorine content.

SUMMARY OF THE INVENTION

An object of this invention is to provide a process for preparing a dry-converted potassium sulfate having a residual chlorine content of less than 3.5%, particularly of less than 2.0% from a dry-converted potassium sulfate obtained under the condition of a potassium chloride to sulfuric acid molar ratio of from 2.0 to 2.2.

Another object of this invention is to provide a method of separating and treating a portion in the form of lump or granule of larger particle sizes of the converted potassium sulfate as above.

Other object will become apparent from the following descriptions.

The present provides (1) a first invention method of treating a converted potassium sulfate for reducing a small amount of chlorine contained therein which comprises pulverizing to 60 mesh pass either all the converted potassium sulfate obtained by mixing and heating potassium chloride with sulfuric acid or potassium hydrogensulfate and containing a small amount of chlorine without subjecting to screening, or a portion remaining on a screen in the range of from 60 to 100 Tyler mesh of the converted potassium sulfate after screening, and calcining a pulverized product at 300° to 500° C. for 5 minutes to one hour, (2) a second method of treating a converted potassium sulfate for reducing a small amount of chlorine contained therein which comprises pulverizing to 60 mesh pass either all the converted potassium sulfate obtained by mixing and heating potassium chloride with sulfuric acid or potassium hydrogensulfate and containing a small amount of chlorine without subjecting to screening, or a portion remaining on a screen in the range of from 60 to 100 Tyler mesh of the converted potassium sulfate after screening, adding thereto for mixing a dilute sulfuric acid in such an amount that the dilute sulfuric acid consists of (a) 3 to 18% by weight of the pulverized product of water and (b) 0.96 to 1.00 molar equivalent of the combined amount of sulfuric acid contained in the pulverized product and sulfuric acid newly added to the amount of chlorine contained in the pulverized product, and calcining a pulverized product thus treated at 300° to 500° C. for 5 minutes to one hour, (3) a third method of treating a converted potassium sulfate for reducing a small amount of chlorine contained therein which comprises pulverizing to 60 Tyler mesh pass either all the converted potassium sulfate obtained by mixing and heating potassium chloride with sulfuric acid or potassium hydrogensulfate and containing a small amount of chlorine without subjecting to screening, or a portion of remaining on a screen in the range of from 60 to 100 Tyler mesh of the converted potassium sulfate after screening, adding thereto for mixing 3 to 20% by weight of the pulverized product of water, and calcining a pulverized product thus treated at 300° to 500° C. for 5 minutes to one hour, and an embodiment of the third method in which 5 to 15% by weight of the pulverized product of water is added thereto for mixing.

DETAILED DESCRIPTION OF THE INVENTION AND THE PREFERRED EMBODIMENTS

This invention will be further described in detail.

(A) Converted potassium sulfate used in the present invention

The converted potassium sulfate used in the present invention is a converted potassium sulfate obtained by dry-mixing and heating 2.0 to 2.2 moles of potassium chloride with one mole of sulfuric acid and containing a small amount of chlorine or a portion thereof remaining on a screen and screening as described below. In the case where potassium hydrogensulfate in place of sulfuric acid as above is used, it may be potassium sulfate obtained by dry-mixing and heating 1.0 to 1.1 moles of potassium chloride with one mole of potassium hydrogensulfate as shown in the equation (2) as above.

Respective samples classified by screening three kinds of converted potassium sulfate A, B and C obtained by repeating the method disclosed in Japanese Patent Laid-open No. 17291/1981 with 10, 20, 32 and 60 Tyler mesh screens respectively were subjected to the analysis thereof for percentage by weight and chlorine content (%) respectively to obtain the result shown in Table 2.

TABLE 2

Weight distribution and chlorine content for respective particle size classes of dry-converted potassium sulfate*

| | Sample | | | | | |
|---|---|---|---|---|---|---|
| | A | | B | | C | |
| | Items of analysis (%) | | | | | |
| Particle size range | % by weight | chlorine content (%) | % by weight | chlorine content (%) | % by weight | chlorine content (%) |
| 10 mesh on | 4.0 | 4.0 | 4.2 | 5.7 | 3.0 | 5.4 |
| 10 mesh pass to 20 mesh on | 10.0 | 4.2 | 10.5 | 5.2 | 9.2 | 5.0 |
| 20 mesh pass to 32 mesh on | 2.0 | 3.4 | 2.3 | 3.1 | 1.2 | 2.5 |
| 32 mesh pass to 60 mesh on | 9.5 | 2.3 | 8.7 | 1.9 | 6.3 | 1.5 |
| 60 mesh pass | 74.5 | 0.6 | 74.7 | 0.48 | 80.3 | 0.75 |
| 60 mesh on | 25.5 | 3.5 | 25.3 | 4.0 | 19.7 | 3.8 |
| Total | 100.0 | 1.31 | 100.0 | 1.37 | 100.0 | 1.35 |

Note*:
Operation condition in the second converter: $KHSO_4/KCl = 0.98$;
Converter temperature: 350° C.;
Average residence time: 30 minutes.

In the case as shown in Table 2, all classes of dry-converted potassium sulfate treated by the method of the present invention, with the exception of the class of 60 mesh pass, contain more than 1.0% of chlorine. That is, the total of all the classes excluding that of 60-mesh pass is usually suitable to be treated, but the class of 10-mesh on, for example, may be independently treated by the method of the present invention. Contrary thereto, the class of 60-mesh pass as shown in Table 2 is not to be subjected to treatment according to the present invention, because the class of 60-mesh pass has a chlorine content well less than 1% and it is beyond of the object of this invention to further reduce the chlorine content.

Converted potassium sulfate used in the present invention has such a particle size range of from lump to granule greater than 60-mesh, and has a chlorine content more than 1.0%. A powder portion thereof having a chlorine content less than about 1.0% may be screened with a 60-mesh screen or with a smaller screen. The use of a screen smaller than a 100-mesh screen is meaningless, because the powder portion to be screened therewith is very little. In such a case, converted potassium sulfate is used without subjecting to screening. To the contrary, the use of a screen coarser than a 60-mesh screen causes a chlorine content of a portion passing the screen to increase to greater than 1%, which requires the application of the method of this invention to the portion passing the screen, and consequently the use of converted potassium sulfate without subjecting to screening as above is simpler.

(B) Pulverization of converted potassium sulfate

Converted potassium sulfate used in the present invention contains a portion having particles ranging in size from a granule larger than 60-mesh to a lump, which are pulverized so as to all be of 60-mesh pass. Pulverization is carried out by the conventional process by use of a pulverizer, for example, a ball mill, roll mill, vibrating mill, or the like. In the case where the portion of larger than 60-mesh presents in a considerable amount due to an incomplete pulverization or screening after pulverization, a calcination step described later needs a higher temperature and a longer period of time, or the calcination effect, that is, reduction of chlorine content in the converted potassium sulfate to be treated is liable to be unsatisfactory.

Pulverization conditions in the case where the pulverizer as above is used are not particularly limited, but, pulverization is usually carried out under the conditions of a temperature of from room temperature to 100° C., and a pulverization time of from 5 minutes to one hour in a ball mill, or of from one to 30 minutes in a vibrating mill.

(C) Mixing with water or dilute sulfuric acid prior to calcination

In the second and third methods provided by the present invention as above, non-pulverized or pulverized converted potassium sulfate is mixed with a certain amount of dilute sulfuric acid or water.

The water mixed as above or the water contained in the dilute sulfuric acid is used in an amount of from 3 to 20% based on the amount of the pulverized converted potassium sulfate. When the amount of water to be added is less than 3%, substantially no difference from the first method provided by the present method is produced so that it is impossible to greatly reduce the chlorine content in converted potassium sulfate as compared with the effect of the first method. On the other hand, use of above 20% does not particularly improve the effect of reducing chlorine content. The sulfuric acid contained in the dilute sulfuric acid used in the second method provided by the present invention is fed in such an amount that the combined amount thereof with the unreacted sulfuric acid in the potassium sulfate is in the range of from 0.96 to 1.0 molar equivalent to the amount of chlorine in the form of KCl in the pulverized potassium sulfate as above. The amount of sulfuric acid in potassium sulfate is readily subjected to quantitative analysis by acidity, and analysis for chlorine can readily be carried out by the conventional method. When the combined amount of sulfuric acid as above is less than 0.96 molar equivalent, no difference in effect is shown compared with the case where water alone is fed as in the third method provided by the present invention, and when the combined amount of sulfuric acid is more than 1.0 molar equivalent, the effect of reducing chlorine content is not improved, but the amount of free sulfuric acid in the final product is increased. In the second method provided by the present invention, the make-up sulfuric acid should be fed along with a considerable amount of water as a dilute sulfuric acid. The concentration of the dilute sulfuric acid is in the range of from 15 to 65%, preferably 20 to 50%. When the concentration is lower than 15%, the upper limit of water/pulverized converted potassium sulfate is 18%, so that it is impossible to feed a desirable amount of sulfuric acid, resulting in no difference in effect compared with the case where water alone is added as in the third method provided by the present invention. When the concentration of the dilute sulfuric acid is higher than 65%, the lower limit of water/pulverized converted potassium sulfate is 3%, so that such a reaction as to be carried out with an intimate contact of the make-up sulfuric acid and unreacted sulfuric acid with the unreacted potassium chloride is difficult to effect.

Mixing of the pulverized converted potassium sulfate with the dilute sulfuric acid or water is effected according to the conventional procedure, in which, for example, the converted potassium sulfate is charged into a ribbon blender or V-type blender, and the dilute sulfuric acid or water is then fed continuously or intermittently with stirring or rotation. Mixing conditions are not particularly limited except for the mixing ratio as above, but mixing is preferably carried out at room temperature to 50° C. for 5 minutes to one hour. The mixing step may be performed in a calcination reactor prior to or during calcination in the calcination step as described below.

(D) Calcination step

The pulverized converted potassium sulfate mixed with water or the dilute sulfuric acid as in C is then subjected to a calcination step. In the first method provided by the present invention, in which neither water nor dilute sulfuric acid are added, the mixing step as above is naturally omitted. The material of the calcination furnace is not particularly limited, so long as it is corrosion resistant to the reaction temperature and reactants as described below. When the calcination temperature is below 500° C., particularly below 400° C., the conventional acidproof brick is satisfactorily used. The calcination furnace may be of a conventional mechanical structure, for example, of a horizontal muffle furnace or a rotary kiln. Calcination may be carried out continuously or batchwise. Either indirect heating or direct heating method may be applicable for maintaining the calcination temperature. Calcination is carried out under the conditions of from 300° to 500° C., preferably 300° to 400° C., and of from 5 minutes to one hour.

When above 500° C. or longer than one hour, calcination effect is not particularly enhanced. On the other hand, when below 300° C. or shorter than 5 minutes, calcination effect is greatly reduced. An off-gas containing hydrogen chloride, steam, a mist of potassium sulfate, etc., which are produced during calcination, is collected through a duct, etc., and is subjected to washing with water, neutralization, etc. to be free of environmental pollution.

According to the methods of the present invention as described above, dry-converted potassium sulfate, which contains 1.0 to 5.0%, usually 2.0 to 4.5% of chlorine in the form of KCl and usually 1 to 4% of unreacted sulfuric acid in terms of $H_2SO_4$, is subjected to a calcination reaction with or without the addition of water or dilute sulfuric acid prior thereto with the result that when neither water nor dilute sulfuric acid are added, the chlorine and free sulfuric acid contents in the potassium sulfate thus treated are greatly reduced, that is, the chlorine content is reduced to below 3.5%, preferably to about 1.0%, and the free sulfuric acid content is reduced to below 2.0%, preferably to about 1.0%, and that when water or dilute sulfuric acid is properly added, the chlorine content in the potassium sulfate thus treated can be reduced to below 2.0, preferably to about 0.4%, and the free sulfuric acid content therein is reduced to below 1.0, preferably to about 0.2%. The potassium sulfate calcined according to the method of the present invention as above has wider applications for use in fertilizer, and others in the chemical industry.

The present invention will be further described by the following examples.

EXAMPLES 1-9; COMPARATIVE EXAMPLES 1-3

Three samples of dry-converted potassium sulfate A, B and C as shown in Table 2, of which all portions larger than 60-mesh were pulverized to 60-mesh pass, were used as the starting material. A predetermined amount of concentrated sulfuric acid (Comparative Examples 1-3), water (Examples 1, 4 and 7), 20% dilute sulfuric acid (Examples 2, 5 and 8), and 50% dilute sulfuric acid (Examples 3, 6 and 9) were used as the treating agent respectively.

Concentrated sulfuric acid, water, and two kinds of dilute sulfuric acids each were placed in a 200 l stainless ribbon blender in an amount shown in the following Table 3 based on 100 Kg of the dry-converted potassium sulfate A, B and C respectively to be stirred for mixing at room temperature for 10 minutes. The resultant mixture was fed continuously to a laboratory rotary kiln having an inner diameter of 30 cm and a length of 3 m, and was subjected to calcination under the conditions of a maximum bulk temperature of 350° C. and a residence time of 30 minutes. Table 3 shows the results of the analysis of the starting material for free sulfuric acid (%) and chlorine (%), the analysis of the treating agent for the concentration of sulfuric acid, the amount of sulfuric acid added (%), and the amount of the treating agent based on the starting material (%), and the analysis of the product calcined for the residual chlorine and concentration of sulfuric acid.

TABLE 3

Results of addition of water, dilute sulfuric acid, or concentrated sulfuric acid to dry-converted potassium sulfate followed by calcination thereof.

| Examples and Comparative Examples | Before calcination | | Sulfuric acid or water added | | | After calcination in a rotary kiln | |
|---|---|---|---|---|---|---|---|
| | Free sulfuric acid (%) | Residual chlorine (%) | Concentration of sulfuric acid (%) | Amount added* (%) | Amount of $H_2SO_4$ (%) | Residual chlorine content (%) | Residual sulfuric acid (%) |
| Comparative Example 1 | 2.5 | 3.5 | 98 | 2.37 | 2.33 | 2.0 | 2.72 |
| Example 1 | " | " | 0.0 | 10.0 | 0.0 | 1.8 | 0.14 |
| Example 2 | " | " | 20 | 11.65 | 2.33 | 0.20 | 0.27 |
| Example 3 | " | " | 50 | 4.66 | 2.33 | 0.41 | 0.55 |
| Comparative Example 2 | 3.0 | 4.0 | 98 | 2.58 | 2.53 | 2.5 | 3.42 |
| Example 4 | " | " | 0.0 | 10.0 | 0.0 | 2.3 | 0.64 |
| Example 5 | " | " | 20 | 12.65 | 2.53 | 0.26 | 0.30 |
| Example 6 | " | " | 50 | 5.06 | 2.53 | 0.46 | 0.64 |
| Comparative Example 3 | 2.8 | 3.8 | 98 | 2.49 | 2.44 | 2.2 | 2.99 |
| Example 7 | " | " | 0.0 | 10.0 | 0.0 | 2.0 | 0.31 |
| Example 8 | " | " | 20 | 12.2 | 2.44 | 0.25 | 0.33 |
| Example 9 | " | " | 50 | 4.88 | 2.44 | 0.43 | 0.58 |

Note:
*% based on dry-converted potassium sulfate

As apparent from the results shown in Table 3, residual chlorine content is greatly reduced after calcination from before calcination in both Comparative Examples and Examples, but Comparative Examples, in which concentrated sufluric acid is added, have such drawbacks that the residual chlorine content remains at a level of above 2.0% after calcination, and that the residual sulfuric acid content is increased after calcination. In the case of the third method provided by the present invention, in which water is added, the chlorine content after calcination is only a little lower than that in the Comparative Example, but the residual sulfuric acid content is greatly reduced to such an extent as to be corresponding to the residual chlorine content reduced after calcination. In the case of the second method provided by the present invention, in which dilute sulfuric acid is added, the residual chlorine content is reduced concurrently with a great reduction of the residual sulfuric acid content and is extremely effective.

EXAMPLE 10

The converted potassium sulfate, which was obtained from the second dry converter for performing the reaction shown by the equation (2) as above at a rate of 1,200 Kg/hr, was subjected to screening with a 60-Tyler mesh screen to obtain a lump portion thereof having particle sizes larger than 60-Tyler mesh at a rate of 320 Kg/hr. The portion thereof was all pulverized in a ball mill to such an extent as to be of 60-mesh pass. A 50% sulfuric acid was added at a rate of 4 Kg/hr in an amount corresponding to an amount of the make-up $H_2SO_4$ to 80 Kg/hr of the portion thus pulverized to be mixed in a ribbon blender. The resultant mixture was fed continuously to a rotary kiln, and was subjected to calcination at 350° C., that is, the maximum temperature of the mixture to be calcined in the kiln, for four and a half hours with a residence time of 30 minutes. During calcination, samples were taken at predetermined intervals for the measurement of the residual chlorine content and free sulfuric acid content therein. The results are shown in Table 4.

TABLE 4

| | Residual chlorine content (%) | Free sulfuric acid content (%) |
|---|---|---|
| Before Calcination (average) | 4.0 | 3.0 |
| After Calcination Started | | |
| one hour later | 0.63 | 0.85 |
| 2 hours later | 0.71 | 0.90 |
| 3 hours later | 0.59 | 0.79 |
| 4 hours later | 0.65 | 0.87 |

As apparent from the results shown in Table 4, the residual chlorine content and free sulfuric acid content are both reduced to a large extent.

EXAMPLE 11

The procedures of Example 10 were repeated to obtain a portion of the converted potassium sulfate having particle sizes greater than 60 Tyler mesh at a rate of 440 Kg/hr. A higher rate of the portion thereof compared with that in Example 10 is due to difference in delicate reaction conditions within the second dry converter. The portion having larger particle sizes as above was all pulverized in a ball mill to such an extent as to be of 60 mesh pass. A 20% sulfuric acid was added at a rate of 12.8 Kg/hr in an amount corresponding to an amount of the make-up $H_2SO_4$ to 110 Kg/hr of the portion thus pulverized to be mixed in a ribbon blender. The resultant mixture was fed continuously to a rotary kiln, and was subjected to calcination in the same manner as in Example 10. Samples were also taken for the measurement of the residual chlorine content and free sulfuric acid content therein as in Example 10. The results are shown in Table 5.

TABLE 5

| | Residual chlorine content (%) | Free sulfuric acid content (%) |
|---|---|---|
| Before Calcination (average) | 3.5 | 2.5 |
| After Calcination Started | | |
| one hour later | 0.43 | 0.57 |
| 2 hours later | 0.39 | 0.51 |
| 3 hours later | 0.30 | 0.41 |
| 4 hours later | 0.40 | 0.53 |

As apparent from the results shown in Table 5, the residual chlorine content and free sulfuric acid content are both reduced to a large extent.

EXAMPLES 12-14

Procedures in Examples 1 to 9 were repeated except that the portions of 3 kinds of dry-converted potassium sulfate A, B and C having larger particle sizes than 60 mesh were used as the starting material respectively, and that no treating agent was added thereto.

Table 6 shows the results of the analysis of the starting material before calcination, and the analysis for the residual chlorine content and residual sulfuric acid content after calcination.

TABLE 6

Results of calcination of dry-converted potassium sulfate without addition of any treating agent:

| | Before calcination | | After calcination | |
|---|---|---|---|---|
| Examples | Free sulfuric acid content (%) | Residual chlorine content (%) | Residual sulfuric acid content (%) | Residual chlorine content (%) |
| Example 12 | 2.5 | 3.5 | 1.52 | 2.8 |
| Example 13 | 3.0 | 4.0 | 1.85 | 3.2 |
| Example 14 | 2.8 | 3.8 | 1.69 | 3.0 |

As apparent from the results shown in Table 6, both the residual sulfuric acid content and residual chlorine content are greatly reduced.

EXAMPLES 15-17; COMPARATIVE EXAMPLE 5

The procedures of Examples 1 -3 were repeated except that the dry-converted potassium sulfate A shown in Table 2 was directly pulverized to 60-mesh pass without being subjected to screening so as to be used as the starting material (Examples 15-17). For comparison, the procedures of Examples 1-3 were repeated except that the converted potassium sulfate A was subjected to no pulverization, and that neither water nor dilute sulfuric acid were added thereto (Comparative Example 5). Table 7 shows the results of the analysis of the starting material, treating agent, and produced calcined respectively.

TABLE 7

Results of the calcination of dry-converted potassium sulfate without being subjected to screening:

| | Before calcination | | Addition of sulfuric acid or water | | | After calcination in a rotary kiln | |
|---|---|---|---|---|---|---|---|
| Examples and Comparative Example | Free sulfuric acid content (%) | Residual chlorine content (%) | Concentration of sulfuric acid (%) | Amount added* (%) | Amount of $H_2SO_4$ (%) | Residual chlorine content (%) | Residual sulfuric acid content (%) |
| Comparative Example 5 | 0.97 | 1.33 | 0.0 | 0.0 | 0.0 | 1.2 | 0.83 |
| Example 15 | 0.97 | 1.33 | 0.0 | 10.0 | 0.0 | 0.70 | 0.08 |
| Example 16 | 0.97 | 1.33 | 2.0 | 4.25 | 0.85 | 0.15 | 0.22 |

TABLE 7-continued

Results of the calcination of dry-converted potassium sulfate without being subjected to screening:

| Examples and Comparative Example | Before calcination | | Addition of sulfuric acid or water | | | After calcination in a rotary kiln | |
|---|---|---|---|---|---|---|---|
| | Free sulfuric acid content (%) | Residual chlorine content (%) | Concentration of sulfuric acid (%) | Amount added* (%) | Amount of $H_2SO_4$ (%) | Residual chlorine content (%) | Residual sulfuric acid content (%) |
| Example 17 | 0.97 | 1.33 | 5.0 | 1.7 | 0.85 | 0.34 | 0.50 |

*Note:
% based on dry converted potassium sulfate

As apparent from the results shown in Table 7, the residual chlorine content and residual sulfuric acid content after calcination are greatly reduced even if the converted potassium sulfate as the starting material is not subjected to screening before pulverization, the addition of water or dilute sulfuric acid, (Examples 15-17). However, in the case where neither pulverization nor treatment with water or dilute sulfuric acid are effected as in Comparative Example 5, calcination has such a low effect that the residual chlorine content and residual sulfuric acid content after calcination are only slightly reduced compared with the residual chlorine content and free sulfuric acid content before calcination respectively.

What is claimed is:

1. A method for the recovery of converted potassium sulfate having a low chlorine content comprising:
   providing a potassium sulfate mixture prepared by mixing and heating potassium chloride with one of sulfuric acid and potassium hydrogen sulfate, said mixture comprising hydrogen sulfate, chlorine and sulfuric acid;
   screening the mixture with a 60-mesh Tyler screen;
   recovering the portion of the mixture passing through the 60-mesh Tyler screen as a portion having a low chlorine content;
   pulverizing the portion of the mixture remaining on the 60-mesh Tyler screening; and
   calcining the pulverized mixture at a temperature of 300°–500° C. for a time of five minutes to one hour to reduce the chlorine content.

2. A method as claimed in claim 1, wherein said converted potassium sulfate is obtained by reacting 2.0 to 2.2 moles of potassium chloride with one mole of sulfuric acid.

3. The method of claim 1 including, before the calcining step:
   adding a dilute solution of sulfuric acid or water to the pulverized mixture in such an amount that the total amount of sulfuric acid in the pulverized mixture equals 0.96 to 1.00 molar equivalent of the amount of chlorine in the pulverized mixture and that the amount of water equals 3 to 20% by weight of the pulverized mixture; and
   mixing the dilute solution of sulfuric acid and water with the pulverized mixture.

4. The method of claim 1, including before calcining:
   adding water to the pulverized mixture in an amount such that the amount of water equals 3 to 20% by weight of the pulverized mixture;
   mixing the water and the pulverized mixture.

5. The method of claim 4, wherein the amount of water added equals 5–15% by weight of the pulverized mixture.

6. The method of claim 4, wherein the temperature range is 300° to 400° C.

7. The method of claim 3, wherein the amount of water added equals 5 to 15% by weight of the pulverized mixture.

8. The method of claim 7, wherein the temperature range is 300° to 400° C.

9. The method of claim 1, wherein the temperature range is 300° to 400° C.

10. The method of claim 3, wherein the temperature range is 300° to 400° C.

11. A method of recovering converted potassium sulfate having a low chlorine concentration comprising:
    providing a potassium sulfate mixture prepared by mixing and heating potassium chloride with one of sulfuric acid and potassium hydrogen sulfate, said mixture comprising hydrogen sulfate, chlorine and sulfuric acid;
    screening the mixture with a 60-mesh Tyler screen; and
    recovering the portion of the mixture passing through the 60-mesh Tyler screen as a portion having a low chlorine concentration.

12. A method as claimed in claim 11, wherein said converted potassium sulfate is obtained by reacting 2.0 to 2.2 moles of potassium chloride with 1 mole of sulfuric acid.

13. A method as claimed in claim 12, wherein said converted potassium sulfate is obtained by reacting 1.0 to 1.1 moles of potassium chloride with 1 mole of potassium hydrogen sulfate.

14. A method as claimed in claim 11, wherein said converted potassium sulfate is obtained by reacting 1.0 to 1.1 moles of potassium chloride with 1 mole of potassium hydrogen sulfate.

15. A process according to claim 11, wherein the chlorine content of the recovered portion passing through the 60-mesh Tyler screen is less than 1% by weight.

* * * * *